J. A. DENNEWITZ.
LAWN MOWER.
APPLICATION FILED JAN. 7, 1910.
1,148,153.
Patented July 27, 1915.
2 SHEETS—SHEET 1.
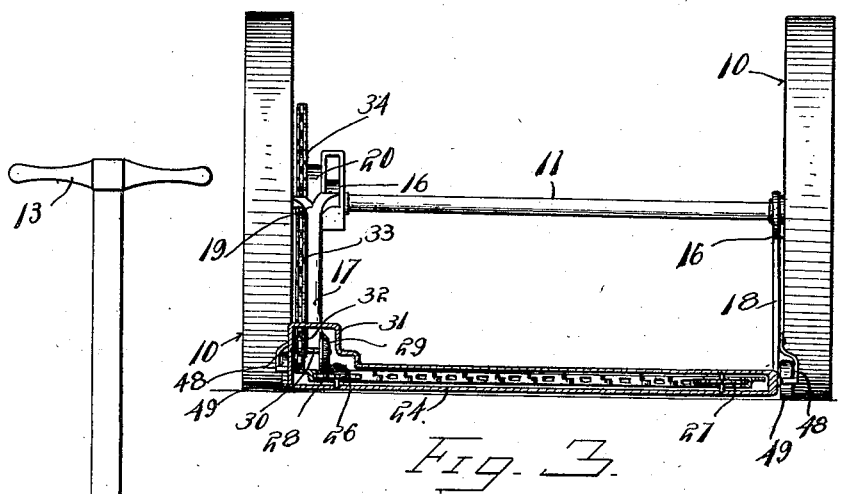
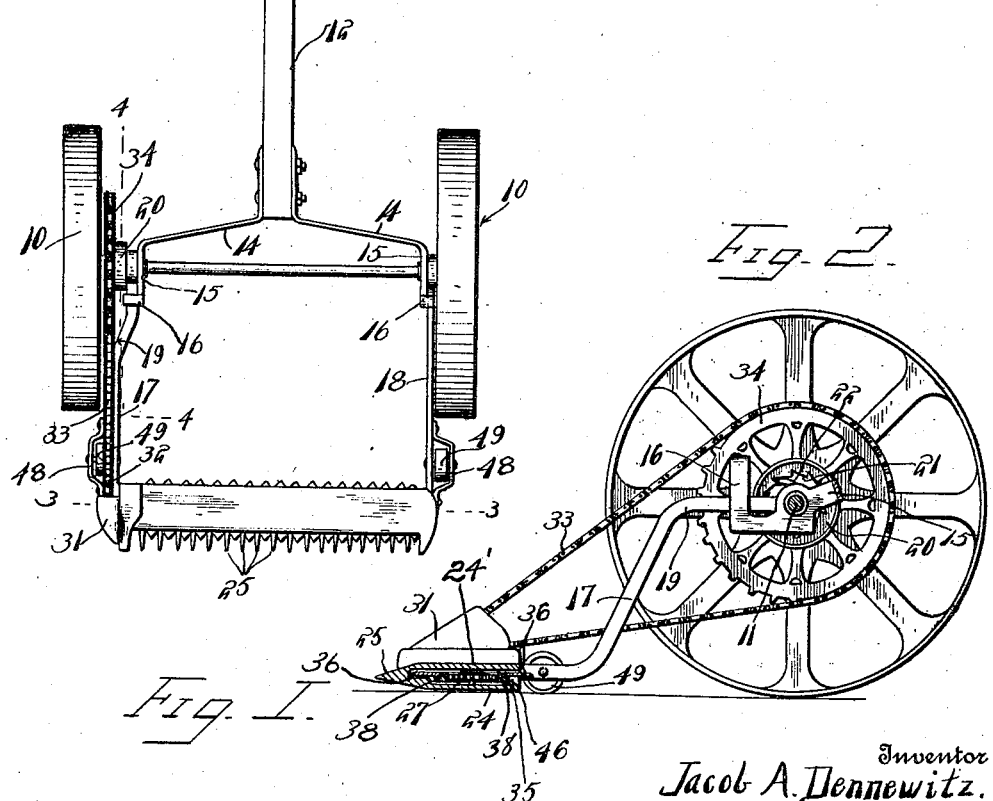
Inventor
Jacob A. Dennewitz.
Witnesses
By
Attorneys

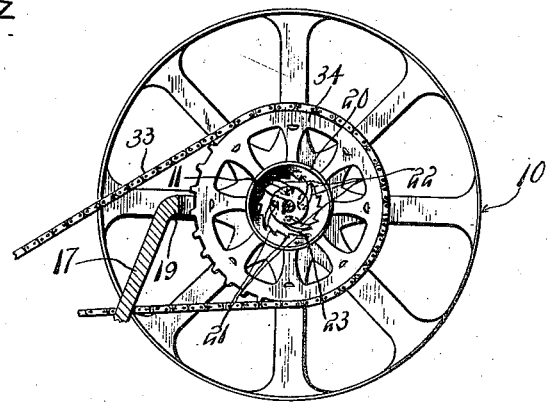
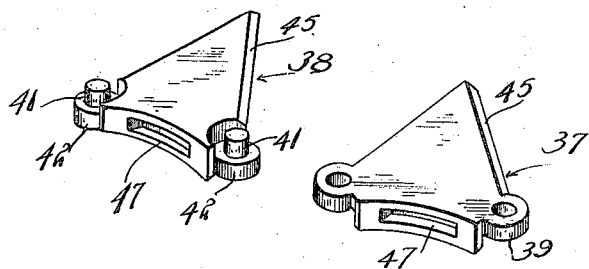
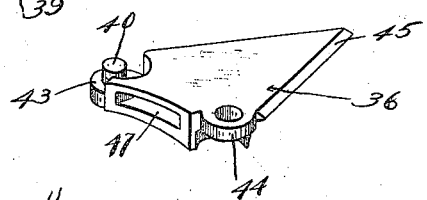
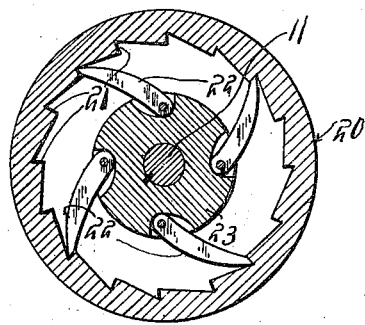

UNITED STATES PATENT OFFICE.

JACOB A. DENNEWITZ, OF GREENCASTLE, INDIANA.

LAWN-MOWER.

1,148,153.	Specification of Letters Patent.	Patented July 27, 1915.

Application filed January 7, 1910. Serial No. 536,812.

*To all whom it may concern:*

Be it known that I, JACOB A. DENNEWITZ, a citizen of the United States, residing at Greencastle, in the county of Putnam, State of Indiana, have invented certain new and useful Improvements in Lawn-Mowers; and I do hereby declare the following to be a full, clear, and exact description of the invention, such as will enable others skilled in the art to which it appertains to make and use the same.

The invention relates to mowing machines and more particularly to the class of lawn mowers.

The primary object of the invention is the provision of a mower in which the endless cutter blades will be prevented against movement when the mower is being moved in one direction and upon movement thereof in the opposite direction the said cutter blade will be brought into operation.

Another object of the invention is the provision of a mower in which the stationary bar supporting the cutter blades is loosely suspended or connected to the driving shaft of the mower and this frame is capable of being vertically adjusted with respect to the ground and the adjustment thereof being controlled by the handle of the mower.

A further object of the invention is the provision of a mower in which the cutter blades are capable of being readily and quickly detached from each other so as to permit the substitution of a new one should any one of the blades become broken or otherwise injured.

A still further object of the invention is the provision of a mower which is simple in construction, thoroughly reliable, efficient and noiseless in operation and one that is inexpensive in the manufacture.

In the drawings accompanying and forming part of this specification is illustrated the preferred form of embodiment of the invention, which to enable those skilled in the art to carry the invention into practice, will be set forth at length in the following description, while the novelty of the invention will be pointed out in the claim succeeding the description.

In the drawings:—Figure 1 is a top plan view of a lawn mower constructed in accordance with the invention. Fig. 2 is a longitudinal vertical sectional view through the same. Fig. 3 is a transverse sectional view on the line 3—3 of Fig. 1. Fig. 4 is a sectional view on the line 5—5 of Fig. 1. Fig. 5 is a detail perspective view of a series of sickle blades separated from each other. Fig. 6 is a sectional view through the hub and adjunct parts.

Similar reference characters indicate corresponding parts throughout the several views in the drawings.

Referring to the drawings by numerals 10 designates the supporting wheels of the mower which are connected by an axle 11, to which is loosely connected a handle bar 12, having laterally projecting grips 13, at its outermost free end to be engaged by an operator, the handle bar 12, being connected to the axle by forwardly diverging bars 14, formed with parallel extensions 15, providing bearings receiving the axle 11, and on the outer ends of these extensions are formed upright guide loops 16, through which are passed downwardly curved arms 17 and 18, each of which is loosely connected to the axle and these arms carry a sickle bar frame which will be hereinafter more fully described.

The arm 17, at its end connected to the axle 11, is bifurcated to form a fork 19, and surrounding the said axle 11, within the fork is a casing 20, which is loose upon the axle and has formed on its inner peripheral wall ratchet teeth 21, the latter being normally engaged by locking dogs 22, pivotally connected at their inner ends to a hub 23, fixed to the axle 11, the latter being disposed within the casing and likewise the dogs. When the axle 11, is rotated in one direction the dogs 22, will be brought into locked engagement with the teeth 21, so as to lock the said casing 20, with the axle so that it will rotate therewith. However, when the axle 11, rotates in the opposite direction, the dogs 22, will disengage from the teeth 21, and ride thereover so that the casing 20, will be unlocked from the axle for the purpose as will be hereinafter more fully described.

The sickle bar frame comprises a lower plate 24, and an upper plate 24' fixed to the arms 17 and 18, and projecting from and fixed to the forward edge of the plate 24, are the usual sickle bar fingers 25, and upon the plate 24, and on the opposite ends of said plate are journaled horizontal sprocket wheels 26 and 27, over which are trained the endless cutter blades as will be hereinafter more fully described. The sprocket wheel 26, is formed with a vertical beveled pinion 28, meshing with a beveled gear 29, journaled upon a stud spindle 30, suitably mounted within a housing 31, at one end of the sickle bar frame and integral with this gear 29, is a sprocket wheel 32, over which is trained a sprocket chain 33, the latter also trained over a sprocket wheel 34, suitably fixed to the casing 20, loosely surrounding the axle 11, of the mower.

The sickle comprises an endless series of cutter blades 36, 37 and 38, the blades 36, being alike, but the blade 37, which is termed the "key" blade has formed thereon laterally projecting perforated ears 39, which detachably engage lugs 40 and 41, on adjacent blades 36, and 38, the latter blade being formed with the lugs 41, rising from laterally projecting ears 42, while the lugs 40, on the blades 36, rise from ears 43, and the remaining perforated ears 44, of these blades 36, engage the lug 40, on adjacent blades in the series. It is obvious that in this manner of the assemblage of the blades any one of the latter may be removed at will so that should one of the blades become broken a substitute new blade may be replaced therefor.

All of the blades are of triangular shape, the opposite diagonal edges being beveled to form cutting edges 45, and on the under faces of the blades are provided ribs 35, the latter engaging in a raceway 46, contained in the plate 24, and in the inner edges of these blades are tooth engaging recesses 47, which receive the teeth of the sprocket wheels 26 and 27, so that the endless sickle may be driven to effect the travel of the blades across the cutter bar fingers 25, on the plate 24, of the sickle frame.

Formed on or secured to the arms 17 and 18, adjacent the sickle frame are bearing straps 48, in which are journaled caster or gage wheels or rollers 49, the latter being adapted to travel upon the ground when the lawn mower is in operation.

From the foregoing description taken in connection with the accompanying drawings, the construction and operation of the invention will be readily understood, without requiring a more extended explanation.

What is claimed is:—

In a lawn mower, an endless chain cutter bar formed of a plurality of links, each of which has a substantially triangular cutting portion, a body portion having a socket in the rear end for the reception of a tooth of a sprocket wheel, lugs projecting from opposite sides of the body portion and in different parallel planes, the upper of the lugs having an opening and the lower of the lugs an upwardly extending pin, said pin being adapted for coöperation with corresponding parts of adjacent elements of the cutter bar.

In testimony whereof, I affix my signature in presence of two witnesses.

JACOB A. DENNEWITZ.

Witnesses:
MARGARET J. BROADSTREET,
ALICE GENTRY.